United States Patent [19]

Hughes et al.

[11] Patent Number: 4,754,868

[45] Date of Patent: Jul. 5, 1988

[54] CONVEYOR BELT CLEANING APPARATUS

[75] Inventors: Septimus Hughes, Cleadon Village, near Sunderland; John Darley, Castlebord, both of England

[73] Assignee: Conveyor Improvements (Doncaster) Limited, Doncaster, England

[21] Appl. No.: 939,707

[22] Filed: Dec. 9, 1986

[30] Foreign Application Priority Data

Oct. 28, 1986 [GB] United Kingdom ............... 86 25768

[51] Int. Cl.⁴ .......................................... B65G 45/00
[52] U.S. Cl. .................................................. 198/499
[58] Field of Search ............................... 198/497–499; 15/256.5

[56] References Cited

U.S. PATENT DOCUMENTS

| | | | |
|---|---|---|---|
| 3,631,968 | 1/1972 | Ward | 198/499 X |
| 3,999,649 | 12/1976 | Andersson | 198/499 |
| 4,053,045 | 10/1977 | Reiter | 198/499 |
| 4,098,394 | 7/1978 | Stahura | 198/499 |

FOREIGN PATENT DOCUMENTS

| | | | |
|---|---|---|---|
| 0843205 | 11/1984 | South Africa | 198/499 |
| 1420439 | 1/1976 | United Kingdom | 198/499 |
| 1451759 | 10/1976 | United Kingdom | 198/499 |

*Primary Examiner*—Robert J. Spar
*Assistant Examiner*—Lyle K. Kimms
*Attorney, Agent, or Firm*—Browdy and Neimark

[57] ABSTRACT

Conveyor belt cleaning apparatus having a scraper assembly including at least one scraper element urged into engagement with the conveyor belt, the opposite ends of the scraper assembly being connected to respective locating arms and the locating arms being mounted at their ends remote from the scraper assembly on respective mounting blocks of composite construction which can be subjected to torsion, there being at least one other resilient means acting to urge the at least one scraper element into engagement with the conveyor belt.

7 Claims, 4 Drawing Sheets

CONVEYOR BELT CLEANING APPARATUS

FIELD OF THE INVENTION

The invention relates to conveyor belt cleaning apparatus of the kind including a scraper blade or scraper assembly which in use extends transversely of the belt, the apparatus being attached to a fixed mounting or mountings, normally to frame structure of the conveyor.

Various constructions of belt cleaning apparatus of the above kind have previously been known. For example, in one particular example, belt cleaning apparatus has included a scraper assembly secured at its opposite ends to respective carrier members constituted by respective leaf springs, the leaf springs being mounted at their ends remote from the scraper assembly on respective brackets pivotally mounted for angular adjustment so that each leaf spring can be pre-loaded to urge the scraper assembly into contact with the conveyor belt. However, it has been found that in certain operating conditions, and particularly when the cleaning apparatus is being used to clean a conveyor belt running at a relatively high speed, the scraper assembly does not remain in contact with the belt but tends to bounce against it so that the apparatus fails to adequately perform its function of cleaning the belt.

The object of the invention is to provide belt cleaning apparatus which will function efficiently over a wide range of belt speeds and operating conditions.

SUMMARY OF THE INVENTION

According to the invention, there is provided conveyor belt cleaning apparatus, having a scraper assembly including at least one scraper element urged into engagement with the conveyor belt, opposite ends of said scraper assembly being connected to respective locating arms and said locating arms being mounted at their ends remote from the scraper assembly on respective mounting blocks adjustably connected to respective fixing brackets which can be secured in alignment to frame structure of the conveyor on opposite sides of the belt, the mounting blocks being of composite construction that is to say each block having a metal casing and a centrally located metal sleeve one of which serves for the connection of the block to the respective locating arm and the other of which serves for the connection of the block to the respective fixing bracket, the space surrounding the sleeve within the casing being filled with a synthetic plastics material and the arrangement being such that during the installation of the cleaning apparatus the mounting blocks can be subjected to torsion to appropriately pre-load the scraper assembly against the conveyor belt by virtue of the resilience of the synthetic plastics material of the mounting blocks, there being at least one other resilient means acting to urge the at least one scraper element into engagement with the conveyor belt and working together with the resilient means constituted by the synthetic plastics material of the mounting blocks. The at least one other resilient means referred to may be provided by a pair of leaf springs which constitute the respective locating arms to which the opposite ends of the scraper assembly are connected. Alternatively, or in addition to this, the scraper assembly may include a number of scraper elements independently and resiliently connected to a cross shaft carried between the free ends of the locating arms. In this latter case, each scraper element may include a length of square section metal tube through which extends a respective non-circular mounting shaft to the opposite ends of which are connected respective blade carrying arms, the square section metal tube of each scraper element being of a larger internal dimension that the square section of the mounting shaft and the clearance space being filled with a solidified mass of a synthetic plastics material. The opposite ends of the cross shaft may be connected to the free ends of the respective leaf springs by means of respective taper plug and socket fixings, the arrangement being such that the scraper blade elements can be adjustably located at a required angle relative to a run of a conveyor belt against which they are to bear.

Means whereby the respective mounting blocks can be adjustably connected to the fixing brackets may be constituted by respective detent means provided for releasably securing the mounting blocks in angularly adjusted positions, the detent means preferably including respective circular plates secured to the fixing brackets and respective fixing lugs carried by stub shafts connected to the mounting blocks, and locating pegs or respective bolts or screws being provided for insertion through matching holes in the circular plates and adjacent fixing lugs when the scraper assembly has been appropriately pre-loaded against the conveyor belt.

BRIEF DESCRIPTION OF THE DRAWINGS

FIG. 6 is a view similar to FIG. 1 and illustrating a possible modification which will be referred to.

DESCRIPTION OF THE PREFERRED EMBODIMENT

Figure 1:
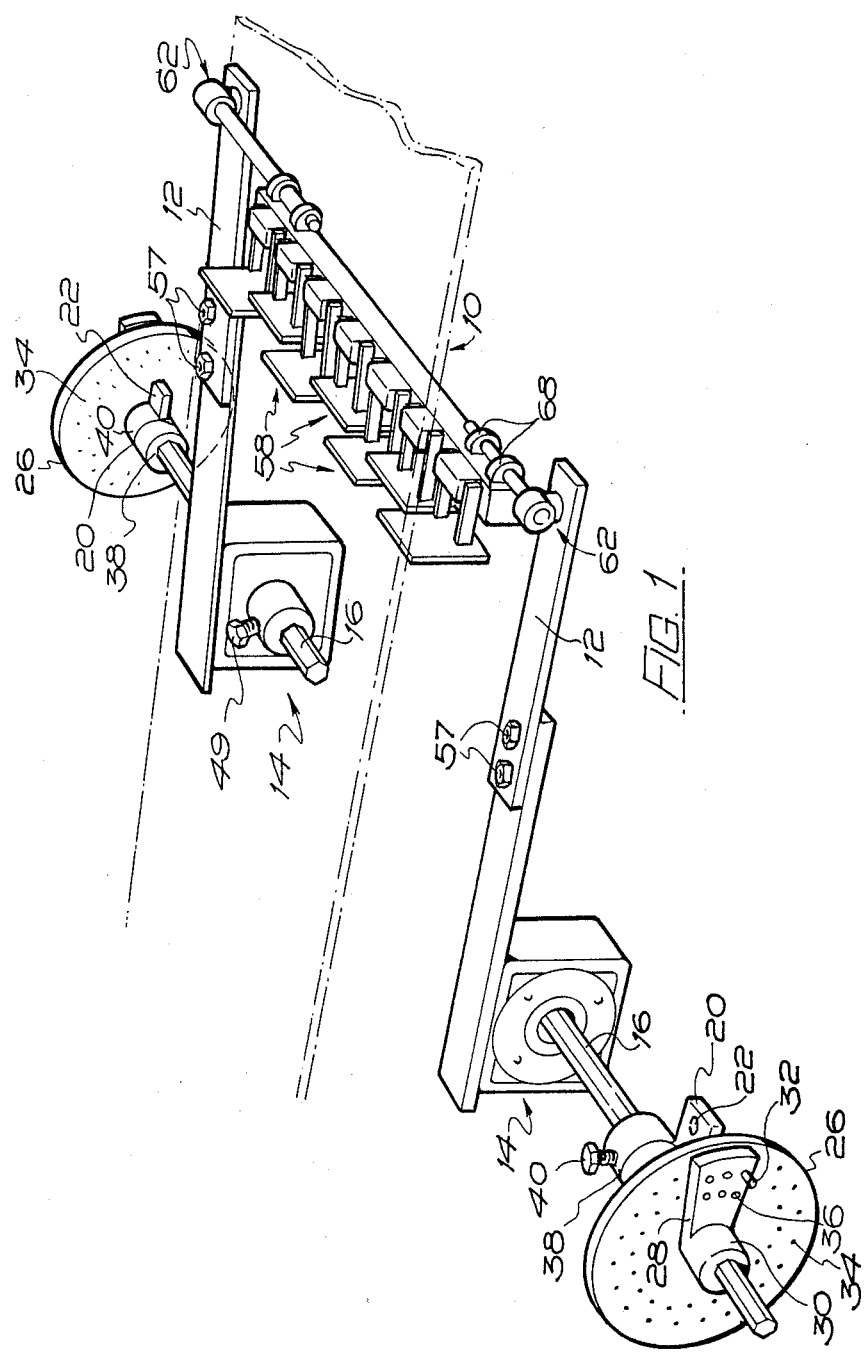
FIG. 1 is a perspective view of conveyor belt cleaning apparatus embodying the invention.

Referring now to the drawings, the apparatus there illustrated for cleaning a conveyor belt (shown in chain-dotted lines in FIG. 1) includes a scraper assembly generally indicated 10 secured at its opposite ends to locating arms constituted by respective leaf springs 12 so as to bear against the underside of the belt.

The leaf springs 12 are mounted at their ends remote from the scraper assembly on respective mounting blocks 14 which are provided with respective stub shafts 16 of hexagonal cross section. The stub shafts extend rotatably through plain cylindrical bores of respective fixing brackets 20, provided with apertured plates 22, which can be bolted to fixed frame structure (not shown) on the conveyor concerned. Respective circular plates 26 are welded to the fixing brackets 20.

The circular plates 26 form part of respective detent means which are provided for releasably securing the mounting blocks in an angularly adjusted position. Each detent means includes a fixing lug 28 having a boss portion 30 with a hexagonal bore by means of which it can be located on the respective stub shaft 16. Each detent means also includes a locating peg 32 by means of which the respective fixing lug can be secured to the adjacent circular plate 26. As shown, each circular plate has a plurality of equally spaced sets of holes 34 arranged on two pitch circle diameters and in which the respective pegs can be engaged. Each fixing lug has two sets of three holes 36 and these are spaced apart in such a way that by their selective use the fixing lug concerned can be secured to the adjacent circular plate in angular increments of adjustment one sixth of those of the angular spacing of the holes in either one of the sets of holes 34 in the adjacent plate. The stub shafts are axially located by respective collars 38 capable of being fixed on said shafts by screws 40.

Figure 2:
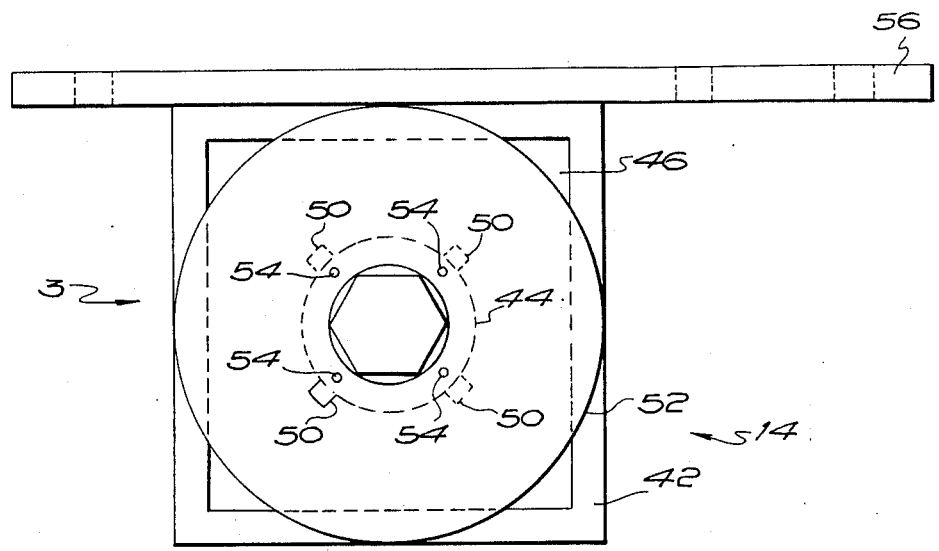
FIG. 2 is a sectional view on the line 2—2 in FIG. 1.
Figure 3:
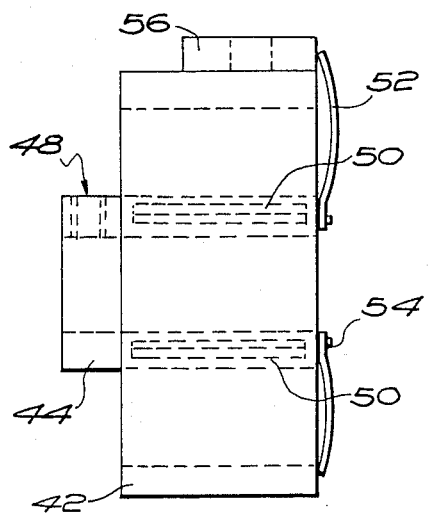
FIG. 3 is a view looking in the direction of arrow 3 in FIG. 2.

Referring now in particular to FIGS. 2 and 3, the mounting blocks 14 on which the leaf springs 12 are mounted are of composite construction, each block having an open ended metal casing 42 and a centrally located metal sleeve 44 for the location of the stub shaft 16, the space 46 surrounding the sleeve within the casing being filled with polyurethane. The metal sleeve 44 extends outwards from one side of the casing as shown, and is provided with a screw threaded hole 48 for the reception of a locking screw 49 by means of which the stub shaft concerned can be axially located in the block. The part of the sleeve located within the width of the casing has been provided with four equally spaced welded on protruberances 50 (constructed by lengths of square section material) so that these form an effective key within the mass of polyurethane. As shown, at the side of the mounting block where the end of the metal sleeve is flush with the side surface of the casing; there is provided a dished spring steel cap 52 which acts as an earthing strip, being fixed to the end surface of the sleeve by screws 54.

One side of the metal casing of the block is provided with a welded on length of flat metal bar 56, this being apertured to receive bolts 57,57 for mounting the respective leaf spring thereon.

During the installation of the cleaning apparatus, the mounting blocks can be subjected to torsion, to appropriately pre-load the scraper assembly against the conveyor belt concerned, by means of levers (not shown) which can be connected to the outer ends of the stub shafts 16. The appropriate amount of pre-load can be maintained in the installation by the use of the detent means referred to above.

Figure 4:
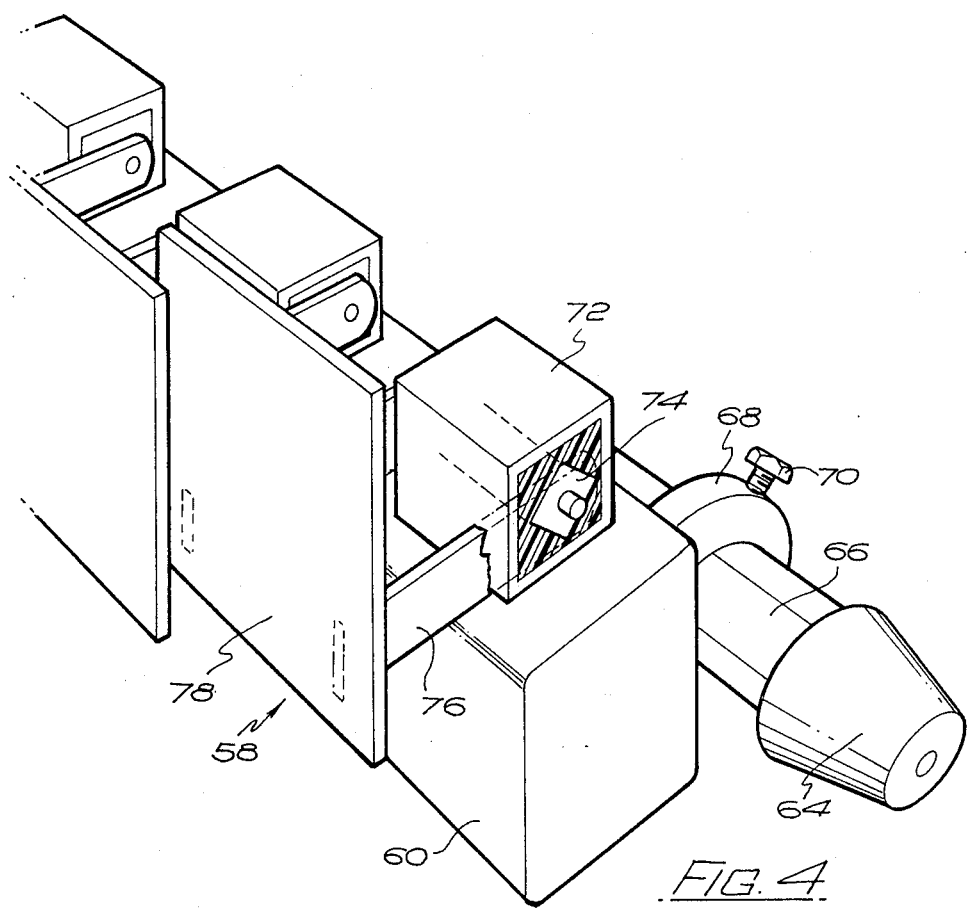
FIG. 4 is a perspective view of a scraper assembly.

The scraper assembly 10 is illustrated in detail in FIG. 4 and includes a number of scraper elements 58 independently connected to a cross shaft 60 of square section bar which is carried between the free ends of the leaf springs. Respective taper plug and socket fixings, generally indicated 62, are provided for connecting the opposite ends of the cross shaft 60 to the free ends of the respective leaf springs. As shown in FIG. 4, the taper plug portions 64 of the fixings are called at the ends of respective lengths of hexagonal bar 66 and the latter extend non-rotatably through pairs of brackets 68,68 welded to the cross shaft and axially located by screws 70. By adjusting the distance by which the lengths of bar extend through the brackets 68,68, the distance between the leaf springs 12 can be adjusted to suit the conveyor installation to which the cleaning apparatus is to be fitted. Each scraper element includes a length of square section metal tube 72 through which extends a respective mounting shaft 74 to the opposite ends of which are welded respective blade carrying arms 76. At the free ends of the blade carrying arms are welded respective scraper blades 78. The square sectional metal tube 72 of each scraper element has a considerably larger internal dimension than the square section of the mounting shaft 74, as shown, but the clearance space is filled by a solidified mass of polyurethane which in operation of the cleaning apparatus acts as a resilient connection between the locating arms constituted by the leaf springs 12 and the respective scraper blade.

It will be seen from FIG. 4 that the pairs of blade carrying arms are of two different lengths so that alternate scraper blades are staggered. In other words there are two rows of scraper blades, one being located slightly in advance of the other. The blades are of a width such that adjacent blades overlap, as shown.

Figure 5:
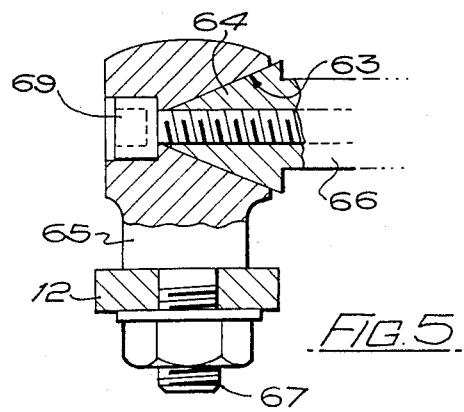
FIG. 5 is a sectional view on the line 5—5 in FIG. 1.

The construction of each taper plug and socket fixing is shown in section in FIG. 5 where it will be seen that the taper plug portions 64 are received in taper sockets 63 which have been formed in respective mounting brackets 65 upstanding from the free ends of the leaf springs 12. The mounting brackets have been formed with screwthreaded stud portions 67 which extend through the leaf springs and are provided with respective nuts on the undersides of said leaf springs. Respective screws 69 which have threaded engagement with screwthreaded axial holes in the taper plug portions of the fixings can be tightened to secure the scraper assembly in an adjusted angular position relative to the leaf springs.

Thus there is provided conveyor belt cleaning apparatus which it has been found will function efficiently over a wide range of belt speeds and operating conditions. It is thought that this is because there is not simply one resilient means for urging the scrape elements into engagement with the belt but three such resilient means working together. Firstly, there is the resilient means connecting the individual scraper elements to the cross shaft 60. Secondly, there is the resilient means constituted by the resilience of the leaf springs 12. Thirdly, there is the resilience of the mounting blocks 14 on which the leaf springs are mounted. It will be understood that during the installation of the cleaning apparatus, when the mounting blocks are subjected to torsion to pre-load the scraper assembly against the conveyor belt concerned, the leaf springs will simultaneously be pre-stressed and the resilient means connecting the individual scraper blade elements to the cross shaft 60 will be pre-stressed. In other words, the pre-stressing will be shared out between the three separate resilient systems.

Figure 6:
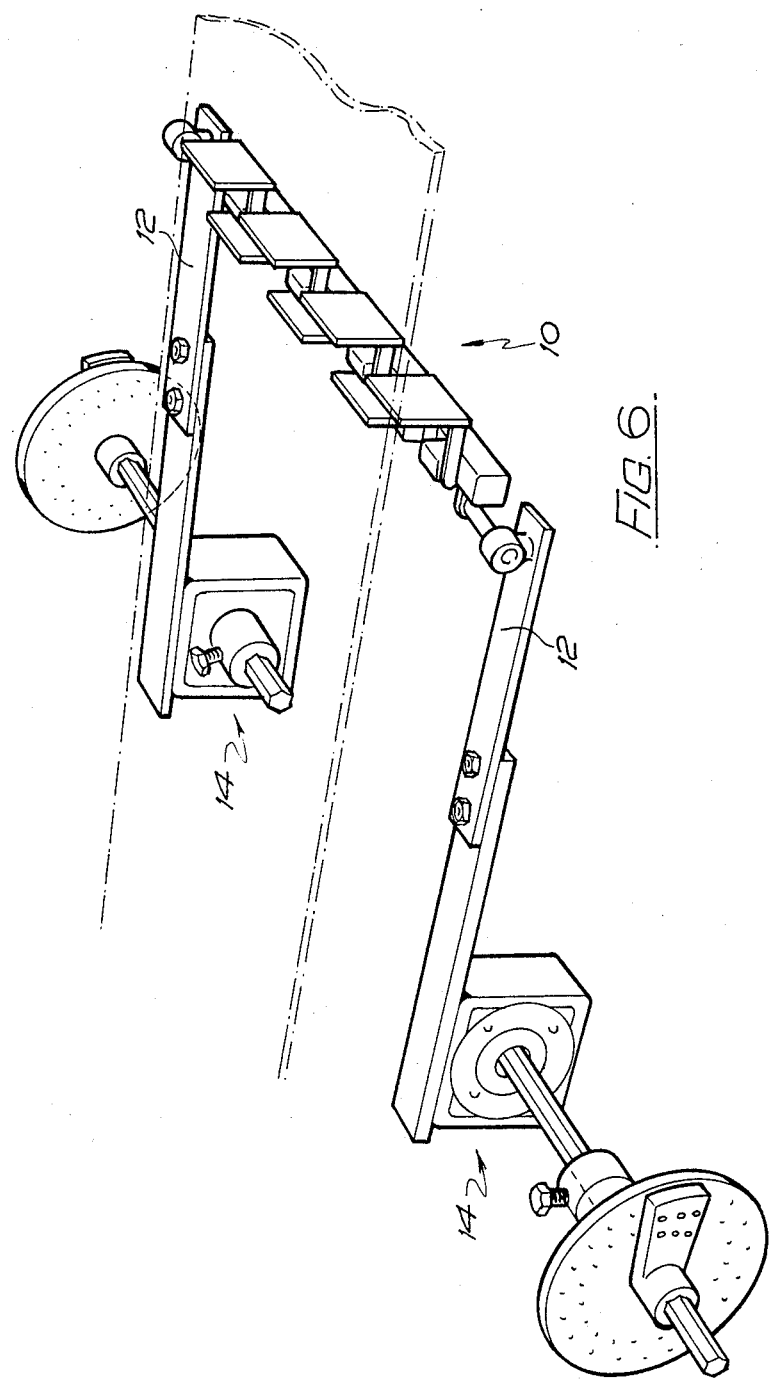

Various modifications may be made. For example, it may be found that the apparatus can be made to work efficiently with only two of the resilient means working together. In addition, it has been found that in some instances it is advantageous to install the scraper assembly in the manner illustrated in FIG. 6 rather than as shown in FIG. 1.

What we claim and desire to secure by Letters Patent is:

1. Conveyor belt cleaning apparatus, having a scraper assembly including a plurality of scraper elements urged into engagement with a conveyor belt, opposite ends of said scraper assembly being connected to respective locating arms and said locating arms being mounted at their ends remote from the scraper assembly on respective mounting blocks, means for adjustably mounting said mounting blocks to respective fixing brackets which can be secured in alignment to a frame structure of the conveyor on opposite sides of the belt, the mounting blocks being of composite construction, each block having a metal casing and a centrally located metal sleeve one of which serves for the connection of the block to the respective locating arm and the other of which serves for the connection of the block to the respective fixing bracket, a space between said metal casing and said metal sleeve being filled with a synthetic plastics material and the arrangement being such that during the installation of the cleaning apparatus the mounting blocks can be subjected to torsion to appropriately pre-load the scraper assembly against the conveyor belt by virtue of the resilience of the synthetic plastics material of the mounting blocks, at least one other resilient means acting to urge each scraper element into engagement with the conveyor belt and working together with the resilient means constituted by the synthetic plastics material of the mounting blocks.

2. Conveyor belt cleaning apparatus as claimed in claim 1, in which the at least one other resilient means is provided by a pair of leaf springs which constitute the respective locating arms to which the opposite ends of the scraper assembly are connected.

3. Conveyor belt cleaning apparatus as claimed in claim 1, in which the scraper assembly includes the plurality of scraper elements independently and resiliently connected to a cross shaft carried between the free ends of the locating arms.

4. Conveyor belt cleaning apparatus as claimed in claim 3, in which each scraper element includes a length of square section metal tube through which extends a respective non-circular mounting shaft to the opposite ends of which are connected to respective blade carrying arms, the square section metal tube of each scraper element being of a larger internal dimension than the non-circular section of the mounting shaft, between said square tube and said mounting shaft being provided with clearance space, the clearance space being filled with a solidified mass of a synthetic plastics material.

5. Conveyor belt cleaning apparatus as claimed in claim 3, in which the opposite ends of the cross shaft are connected to the free ends of the respective locating arms by means of respective taper plug and socket fixings, the arrangement being such that the scraper blade elements can be adjustably located at a required angle relative to a run of the conveyor belt against which they are to bear.

6. Conveyor belt cleaning apparatus as claimed in claim 1, in which said means for adjustably mounting said mounting blocks comprises detent means provided for each mounting block for releasably securing the mounting blocks in angularly adjusted positions.

7. Conveyor belt cleaning apparatus as claimed in claim 6, in which each detent means includes a circular plate secured to the fixing bracket and a fixing lug carried by a stub shaft connected to the mounting block, a locating peg being provided for insertion through matching holes in the circular plate and adjacent fixing lug when the scraper assembly has been appropriately pre-loaded against the conveyor belt.

* * * * *